(12) United States Patent
Aihara

(10) Patent No.: US 11,835,902 B2
(45) Date of Patent: Dec. 5, 2023

(54) IMAGE READING APPARATUS AND IMAGE FORMING SYSTEM

(71) Applicant: CANON KABUSHIKI KAISHA, Tokyo (JP)

(72) Inventor: Ryo Aihara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 17/538,967

(22) Filed: Nov. 30, 2021

(65) Prior Publication Data

US 2022/0177245 A1   Jun. 9, 2022

(30) Foreign Application Priority Data

Dec. 3, 2020  (JP) ................................. 2020-201382

(51) Int. Cl.
*G03G 15/00*  (2006.01)
*H04N 1/00*  (2006.01)
(Continued)

(52) U.S. Cl.
CPC ......... *G03G 15/5062* (2013.01); *G03G 15/55* (2013.01); *G03G 15/6573* (2013.01); *H04N 1/1235* (2013.01); *H04N 1/1245* (2013.01); *B65H 9/08* (2013.01); *B65H 2401/15* (2013.01); *B65H 2401/22* (2013.01); *B65H 2402/54* (2013.01); *G03G 15/6529* (2013.01); *G03G 2215/00616* (2013.01)

(58) Field of Classification Search
CPC .. G03G 15/5062; G03G 15/55; G03G 15/556; G03G 15/6573; G03G 2215/00042; G03G 2215/00067; G03G 2215/00569; G03G 2215/00616; H04N 1/00045; H04N 1/00058; H04N 1/1225; H04N 1/1235; H04N 1/1245; H04N 2201/0448; H04N 2201/0456
USPC .................. 399/11, 13, 49, 72, 74; 358/496
See application file for complete search history.

(56) References Cited

U.S. PATENT DOCUMENTS 7,508,554 B2 *  3/2009  Tomita ................. H04N 1/1215
 358/496
7,733,542 B2 *  6/2010  Lin ..................... H04N 1/00519
 399/367
(Continued)

FOREIGN PATENT DOCUMENTS

JP   2010-268058   11/2010

*Primary Examiner* — Robert B Beatty
(74) *Attorney, Agent, or Firm* — Venable LLP

(57) ABSTRACT

An image reading apparatus includes a conveyance unit, a first reading unit, a first guide portion, a second reading unit, and a second guide portion. The second reading unit includes a rectangular transparent member, an optical reading unit, a housing, a first and a second contact portions, a first and a second pressing members, and a protruding portion. The first and the second contact portions are protruding from a facing surface of the housing. The protruding portion, when viewed from an upstream side in a conveyance direction of a recording material passing through a conveyance path between the second reading unit and the second guide portion, is disposed between the first contact portion and the second contact portion and protruding from the facing surface of the housing, a protruding amount of the protruding portion being smaller than protruding amounts of the first and the second contact portions.

12 Claims, 10 Drawing Sheets

(51) Int. Cl.
*H04N 1/12* (2006.01)
*B65H 9/08* (2006.01)

(56) References Cited

U.S. PATENT DOCUMENTS

| | | | | |
|---|---|---|---|---|
| 7,796,310 | B2* | 9/2010 | Hasegawa | H04N 1/00755 |
| | | | | 358/475 |
| 8,208,182 | B2* | 6/2012 | Han | H04N 1/2032 |
| | | | | 358/408 |
| 8,654,406 | B2* | 2/2014 | Hara | H04N 1/1065 |
| | | | | 399/95 |
| 8,687,247 | B2* | 4/2014 | Osakabe | H04N 1/00572 |
| | | | | 358/496 |
| 8,693,060 | B2 | 4/2014 | Ito | |
| 8,988,742 | B2* | 3/2015 | Sugiyama | H04N 1/031 |
| | | | | 358/496 |
| 2007/0153336 | A1* | 7/2007 | Sheng | H04N 1/103 |
| | | | | 358/474 |
| 2009/0231643 | A1* | 9/2009 | Tan | H04N 1/203 |
| | | | | 358/497 |
| 2010/0073742 | A1* | 3/2010 | Tan | H04N 1/203 |
| | | | | 358/498 |
| 2017/0171417 | A1* | 6/2017 | Kasuga | H04N 1/0282 |
| 2018/0181060 | A1* | 6/2018 | Fujiya | G03G 15/5062 |

* cited by examiner

IMAGE READING APPARATUS AND IMAGE FORMING SYSTEM

BACKGROUND OF THE INVENTION

Field of the Invention

This invention relates to an image reading apparatus reading an image formed on a recording material and an image forming system including this image reading apparatus.

Description of the Related Art

In an image forming apparatus such as a printer and a copying machine, in a case forming images on both surfaces of a recording material, the image formation on a front surface (first surface) of the recording material and the image formation on a back surface (second surface opposite the first surface) are performed separately. That is, after the image formation on the front surface, the image formation on the back surface of the recording material is performed. Therefore, it is necessary to adjust image forming positions on the front and back surfaces of the recording material so that image forming positions (printing positions) are not relatively displaced (for example, does not cause a blur of a printed character and the like). Therefore, the image forming apparatus is configured to adjust the positions of the images to be formed on the front and back surfaces based on each of the images read on the front and back surfaces by reading the images formed on the front and back surfaces of the recording material.

Hitherto, an image reading apparatus in which, by disposing a contact glass on a side opposite an image forming surface of the recording material on a conveyance path on which the recording material is conveyed, the image formed on the recording material is read by an image sensor via the contact glass is suggested (Japanese Patent Application Laid-Open No. 2010-268058). As described in Japanese Patent Application Laid-Open No. 2010-268058, a reading reference member (also called as a backing roller) is rotatably disposed in the image reading apparatus. The backing roller is disposed opposite the contact glass so that a gap with the contact glass is formed correspondingly to a focal depth of the image sensor. When the recording material passes through this gap, the image on the recording material is read by the image sensor.

Incidentally, if it is possible to read the images on both surfaces in the single conveyance of the recording material, it is possible to perform an image reading efficiently. So as to achieve this, for example, a second image reading unit reading the image on the back surface (second surface) and a first image reading unit reading the image on the front surface (first surface) are disposed in sequence from upstream along the conveyance path of the recording material. In some cases, these first and second image reading units are constituted by common parts from viewpoints of maintenance and cost.

However, in a case where the first and second image reading units described in Japanese Patent Application Laid-Open No. 2010-268058 are used as the image reading unit, in some cases, the recording material blocks the gap between the contact glass and the backing roller opposite, and defective conveyance occurs. That is, in the image reading unit as described above, in some cases, the contact glass is fixed by pressing the contact glass onto an accommodating portion accommodating the image sensor by a pressing member. Then, in a case where the contact glass is disposed on an upper side in a vertical direction with respect to the recording material passing through the gap with the backing roller, in some cases, a part of the contact glass where the pressing member is not disposed bends in a vertically lower direction by the own weight of the contact glass. This is because, in the image reading apparatus hitherto, in a case where the contact glass bends, the gap formed between the backing roller and the contact glass becomes excessively narrow so that it becomes difficult for the recording material to pass through the gap.

So as to prevent the defective conveyance caused by the bending of the contact glass, a configuration to strengthen the pressing force of the pressing member holding the contact glass is considered. However, in a case where the first and the second image reading units are constituted by the common parts as described above, when the pressing force of the pressing member is determined corresponding to the image reading unit disposed on the upper side in the vertical direction, the contact glass of the image reading unit disposed on a lower side in the vertical direction becomes easy to bend. This is because, in the image reading unit disposed on the lower side in the vertical direction, the contact glass becomes easy to bend in a direction away from the backing roller by the pressing force of the pressing member onto the contact glass and the own weight of the contact glass. In a case where the contact glass of the image reading unit disposed on the lower side in the vertical direction bends as described above, a distance of the recording material, which is being conveyed, with respect to the image sensor changes so that the reading precision of the image is possibly lowered. As described above, in the case where the first and the second image reading units are constituted by the common parts, it has been difficult to compatibly achieve the suppression of the defective conveyance and the improvement in the reading precision of the image.

In view of a problem described above, purposes of this disclosure are to offer the image reading apparatus which is capable of compatibly suppressing the defective conveyance of the recording material caused by the bending of the contact glass and the improvement in the reading precision of the image, and an image forming system including this.

SUMMARY OF THE INVENTION

According to a first aspect of the present invention, an image reading apparatus configured to read an image formed by an image forming unit forming the image on a recording material and disposed downstream of the image forming unit in a conveyance direction of the recording material includes a conveyance unit configured to convey the recording material, a first reading unit configured to read the image on a first surface of the recording material from upward in a vertical direction, a first guide portion disposed interspatially lower in the vertical direction with respect to the first reading unit and forming a conveyance path of the recording material with the first reading unit, a second reading unit configured to read the image on a second surface opposite the first surface of the recording material from downward in the vertical direction, and a second guide portion disposed interspatially upper in the vertical direction with respect to the second reading unit and forming a conveyance path of the recording material with the second reading unit. The second reading unit includes a rectangular transparent member, an optical reading unit configured to read the image by irradiating light onto the second surface of the recording material via the transparent member, a housing comprising a facing surface facing the transparent member and accommodating the optical reading unit with the transparent member, a first contact portion protruding from the facing surface of the housing and coming into contact with the transparent member on a side of a first end separated from a center in a longitudinal direction of the transparent member, a second contact portion protruding from the facing surface of the housing and coming into contact with the transparent member on a side of a second end opposite the first end in the longitudinal direction of the transparent member, a first pressing member pressing an opposite surface opposite a contact surface of the transparent member toward the housing at a position closer to the center than the first contact portion in the longitudinal direction of the transparent member, the contact surface being a surface on which the first contact portion comes into contact with the transparent member, a second pressing member pressing the opposite surface of the transparent member toward the housing at a position closer to the center than the second contact portion in the longitudinal direction of the transparent member, and a protruding portion, in a case where viewed from an upstream side in the conveyance direction of the recording material passing through the conveyance path between the second reading unit and the second guide portion, disposed between the first contact portion and the second contact portion and protruding from the facing surface of the housing, a protruding amount of the protruding portion being smaller than protruding amounts of the first contact portion and the second contact portion.

According to a second aspect of the present invention, an image forming system includes an image forming apparatus comprising the image forming unit, and the image reading apparatus according to claim 1 coupled to the image forming apparatus and configured to read the image on the recording material discharged from the image forming apparatus.

Further features of the present invention will become apparent from the following description of exemplary embodiments with reference to the attached drawings.

DESCRIPTION OF THE EMBODIMENTS

Image Forming System

Figure 1:
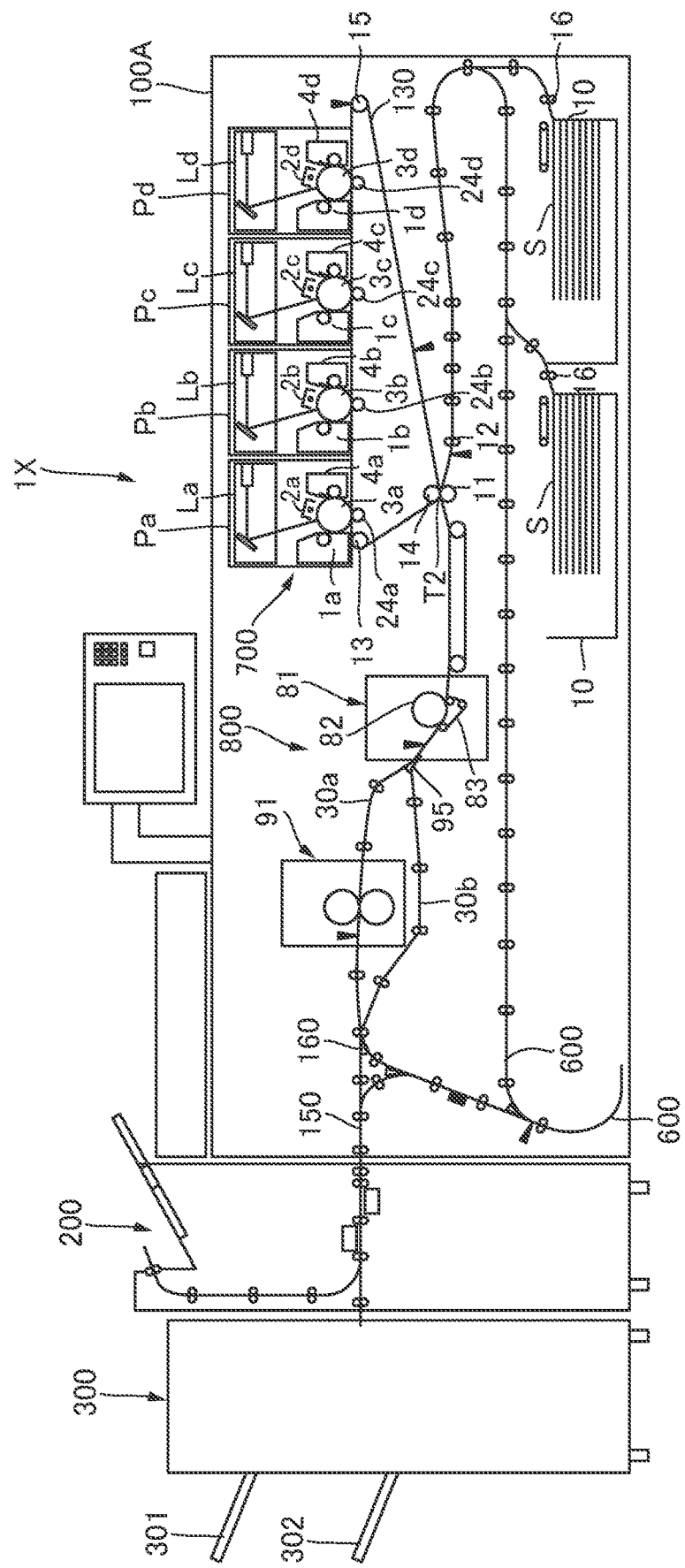
FIG. 1 is a schematic diagram showing an image forming system including an image reading apparatus of this embodiment.

Using FIG. 1, a schematic configuration of an image forming system including an image reading apparatus of this embodiment will be described. The image forming system 1X shown in FIG. 1 includes an image forming apparatus 100, the image reading apparatus 200, and a finisher apparatus 300. The image forming apparatus 100, the image reading apparatus 200, and the finisher apparatus 300 are connected in a manner capable of receiving and delivering a recording material S. In this embodiment, the image reading apparatus 200 and the finisher apparatus 300 are post-process units which are freely retrofittable to the image forming apparatus 100 for function enhancement and capable of performing post-processes of the recording material S on which a toner image has been formed by the image forming apparatus 100, as described later.

These image forming apparatus 100, image reading apparatus 200, and finisher apparatus 300 are coupled in a manner capable of transmitting and receiving data to and from each other via a communication interface capable of performing serial and parallel communications. Thus, the image forming apparatus 100 is capable of monitoring, while controlling, operating states, including the failure, of the image reading apparatus 200 and the finisher apparatus 300.

Image Forming Apparatus

At first, the image forming apparatus 100 will be described. The image forming apparatus 100 is a tandem type full color printer of an electrophotographic system. The image forming apparatus 100 includes image forming units Pa, Pb, Pc, and Pd which respectively form images of yellow, magenta, cyan, and black. The image forming apparatus 100 forms the toner image on the recording material S in accordance with an image signal transmitted from a document reading apparatus 190 coupled to an apparatus body 100A or an external apparatus such as a personal computer, not shown, communicably coupled to the apparatus body 100A.

To be noted, in a case of this embodiment, an image forming unit 700 forming the toner image on the recording material S is constituted by the image forming units Pa to Pd, primary transfer rollers 24a to 24d, an intermediate transfer belt 130, a plurality of rollers 13 to 15, and a secondary transfer outer roller 11. Further, the recording material S includes various kinds of recording materials S cut beforehand (so-called cut sheet) such as a paper including a standard paper, cardboard, a rough paper, an uneven paper, a coated paper, and the like, a plastic film, and a cloth.

As shown in FIG. 1, the image forming units Pa, Pb, Pc, and Pd are disposed inside the apparatus body 100A in a line along a moving direction of the intermediate transfer belt 130. The intermediate transfer belt 130 is stretched over the plurality of rollers 13, 14, and 15, and moved in a clockwise direction in the figure. Further, the intermediate transfer belt 130 bears and conveys the toner image that has been primarily transferred as described later. The secondary transfer outer roller 11 is disposed at a position opposite a secondary transfer inner roller 14 stretching the intermediate transfer belt 130 across the intermediate transfer belt 130, and forms a secondary transfer portion T2 transferring the toner image on the intermediate transfer belt 130 onto the recording material S. A fixing unit 800 is disposed downstream of the secondary transfer portion T2 in a conveyance direction of the recording material S.

A plurality (in this embodiment, two cassettes) of cassettes 10 accommodating the recording material S are disposed below the image forming unit 700. The recording materials S different in sizes and thicknesses are accommodated in the cassettes 10, and the recording material S is selectively conveyed from either one of the cassettes 10. The recording material S is conveyed from the cassette 10 by a conveyance roller 16 toward a registration roller 12 via a conveyance path. Thereafter, the recording material S is conveyed toward the secondary transfer portion T2 by rotating the registration roller 12 in synchronization with the toner image formed on the intermediate transfer belt 130. To be noted, it is not limited to the recording material S accommodated in the cassette 10, and acceptable to convey the recording material S placed on a manual sheet feed portion (not shown).

The image forming units Pa, Pb, Pc, and Pd are substantially the same in a configuration except for a developing color of the toner image. Therefore, the image forming unit Pa of yellow will be described as a representative herein, and descriptions of the other image forming units Pb, Pc, and Pd will be omitted.

In the image forming unit Pa, a photosensitive drum 3a of a cylindrical type is disposed as a photosensitive member. The photosensitive drum 3a is rotatably driven in a counter clockwise direction in the figure. A charge unit 2a, an exposing unit La, a developing unit 1a, the primary transfer roller 24a, and a drum cleaning unit 4a are disposed around the photosensitive drum 3a.

A process to form, for example, a full color image by the image forming apparatus 100 will be described. At first, when an image forming operation is started, a surface of the photosensitive drum 3a, which is rotating, is uniformly charged by the charge unit 2a. The charge unit 2a is, for example, a corona charger charging the photosensitive drum 3a in a dark potential of a uniform negative polarity by irradiating a charged particle accompanying corona discharge, and the like. Next, the photosensitive drum 3a is scanned and exposed with a laser beam irradiated from the exposing unit La in accordance with the image signal. Herewith, an electrostatic latent image in accordance with the image signal is formed on the surface of the photosensitive drum 3a. The electrostatic latent image formed on the photosensitive drum 3a is developed to the toner image, which is a visible image, by the developer containing a toner and a carrier accommodated inside the developing unit 1a. In the case of this embodiment, the developing units 1a to 1d use the two-component developer containing a non-magnetic toner and a magnetic carrier as the developer.

The toner image formed on the photosensitive drum 3a is primarily transferred to the intermediate transfer belt 130 at a primary transfer portion T1 formed with the primary transfer roller 24a disposed opposite the photosensitive drum 3a across the intermediate transfer belt 130. At this time, a primary transfer bias is applied to the primary transfer roller 24a. A residual toner remained on the surface of the photosensitive drum 3a after the primary transfer is collected by the drum cleaning unit 4a.

After these operations have been performed at each of the image forming units Pa, Pb, Pc, and Pd of yellow, magenta, cyan, and black in sequence, the toner images of four colors are superimposed on the intermediate transfer belt 130. Thereafter, the recording material S accommodated in the cassette 10 is conveyed to the secondary transfer portion T2 in a timing synchronizing with the formation of the toner image. Further, by applying the secondary transfer bias to the secondary transfer outer roller 11, the full color toner image formed on the intermediate transfer belt 130 is collectively transferred to the recording material S. A residual toner remained on the intermediate transfer belt 130 after the secondary transfer is collected by a belt cleaning unit 22.

The recording material S onto which the toner image has been transferred is conveyed to the fixing unit 800. The fixing unit 800 fixes the toner image on the recording material S by providing the recording material S, onto which the toner image has been transferred, with heat and pressure. In the case of this embodiment, after the heat and pressure have been provided by a first fixing device 81, it is possible to selectively provide the heat and pressure by a second fixing device 91. In the fixing unit 800, it is possible to switch, by a fixing switch flapper 95, between conveying the recording material S to the second fixing device 91 after passed through the first fixing device 81 and conveying the recording material S by circumventing the second fixing device 91 after passed through the first fixing device 81.

The second fixing device 91 is disposed downstream of the first fixing device 81 in the conveyance direction of the recording material S. The second fixing device 91 is selectively used for a purpose of such as further providing gloss on the toner image on the recording material S fixed by the first fixing device 81. For example, in a case where the recording material S is the coated paper such as a glossy paper and a synthetic paper, the recording material S passed through the first fixing device 81 is conveyed on a fixing route 30a so that the fixing is performed at both of the first and second fixing devices 81 and 91. On the other hand, in a case where the recording material S is a non-coated paper such as the standard paper, the recording material S passed through the first fixing device 81 is conveyed on a fixing bypass route 30b circumventing the second fixing device 91 so that the fixing is not performed at the second fixing device 91 while performing the fixing at the first fixing device 81.

Since it is acceptable that the first and second fixing devices 81 and 91 above are the same in a configuration, descriptions will be provided by taking the first fixing device 81 as an example herein. The first fixing device 81 includes a fixing roller 82 (or a fixing belt) coming into contact with the surface of the recording material S, onto which the toner image has been transferred, in a rotatable manner, and a pressing belt 83 (or pressing roller) forming a fixing nip portion with the fixing roller 82 by coming into pressure contact with the fixing roller 82. The fixing roller 82 is heated by a heater 84, and the pressing belt 83 is heated by a heater, not shown. The first fixing device 81 fixes the toner image on the recording material S by heating and pressing the recording material S, on which the toner image has been formed, at the fixing nip portion formed by the fixing roller 82 and the pressing belt 83, while nipping and conveying the recording material S at the fixing nip portion. Thus, the toner of the toner image formed on the recording material S is melted and mixed by the heat and pressure, and is fixed on the recording material S as the full color image.

In the case of this embodiment, the image forming apparatus 100 is capable of performing duplex printing. In a case of one-side printing, the recording material S on which the toner image has been fixed is conveyed to a discharge conveyance path 150 and discharged to an outside of the apparatus body 100A (outside the apparatus body) from a sheet discharge port of the apparatus body 100A. In a case of the duplex printing, the recording material S on which the toner image has been fixed is conveyed to a duplex inverse conveyance path 600. On the duplex inverse conveyance path 600, the recording material S is inverted by a switch-back action, and front and back surfaces of the recording material S are inverted. The inverted recording material S is conveyed toward the registration roller 12, and conveyed to the secondary transfer portion T2 by the registration roller 12 in a state where the back surface, on which the toner image has not been printed, faces a side of the intermediate transfer belt 130. At the secondary transfer portion T2, the full color toner image formed on the intermediate transfer belt 130 is secondarily transferred to the recording material S (on the back surface side) collectively. Thereafter, the toner image on the recording material S is fixed by the fixing unit 800, and then the recording material S is discharged outside the apparatus body 100A from the sheet discharge port in a state where the surface on which the image has been formed immediately before faces upwards. To be noted, switching between the discharge conveyance path 150 and the duplex inverse conveyance path 600 is performed by a conveyance switch flapper 160.

In the case of this embodiment, the recording material S discharged from the image forming apparatus 100 is conveyed by the image reading apparatus 200. In the case of this embodiment, the image reading apparatus 200 is disposed so as to read the images (toner images) formed on both surfaces of the recording material S by the image forming apparatus 100. The image reading apparatus 200 of this embodiment will be described later (refer to FIG. 2).

Further, the finisher apparatus 300 is coupled to the image reading apparatus 200 in a manner capable of receiving the recording material S. The finisher apparatus 300 performs post-process processing, such as a punching process punching a hole in the recording material S and a stapling process bundling and stapling a plurality of sheets of the recording material S, of the recording material S conveyed from the image reading apparatus 200 to the finisher apparatus 300. In the finisher apparatus 300, the recording material S, which has been punched, and a bundle of the recording material S, which has been stapled, are separately discharged to an upper sheet discharge tray 301 and a lower sheet discharge tray 302, respectively.

Image Reading Apparatus

Figure 2:
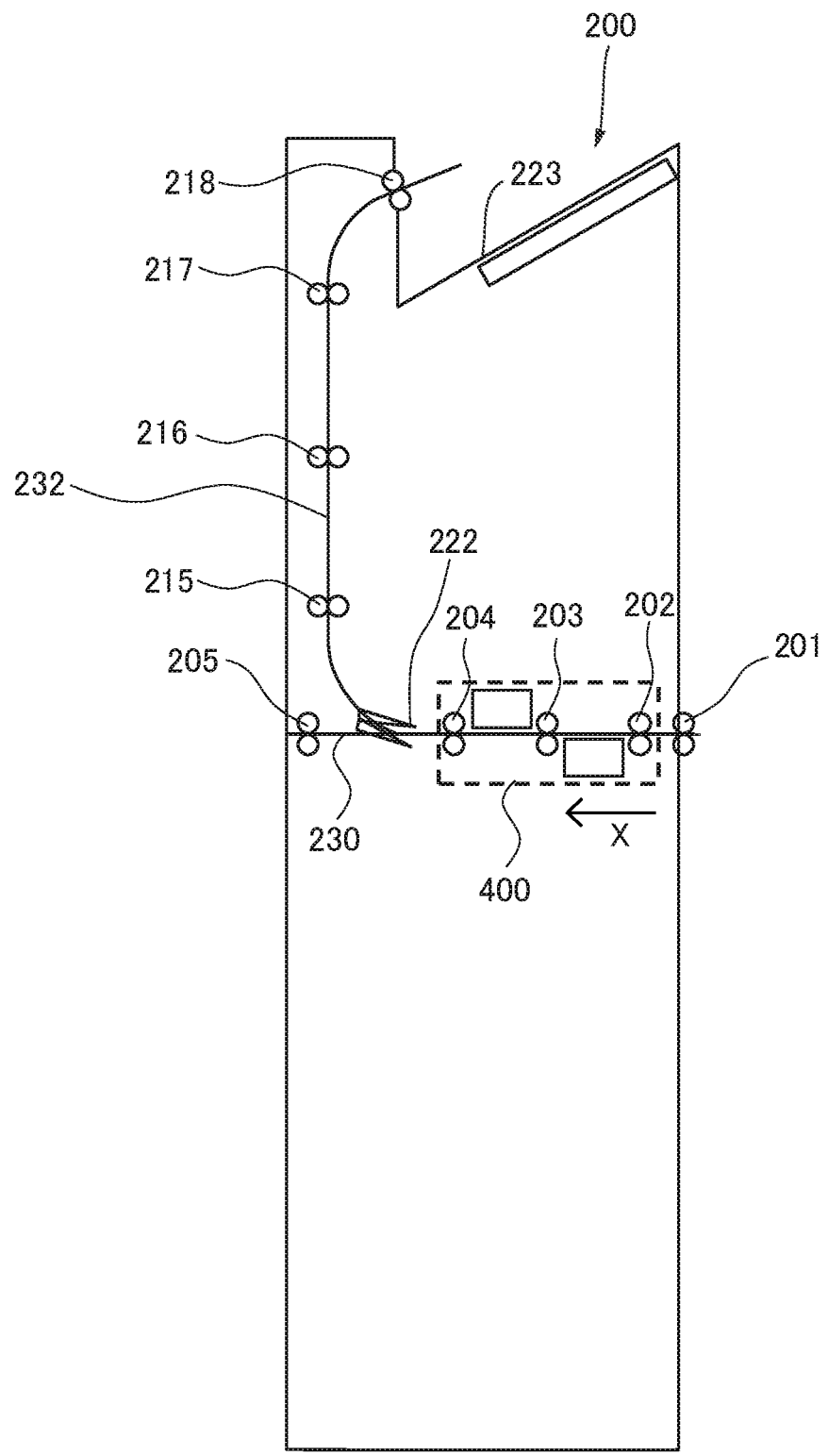
FIG. 2 is a schematic diagram showing the image reading apparatus of this embodiment.

Next, using FIG. 2, a schematic configuration of the image reading apparatus 200 of this embodiment will be described. As shown in FIG. 2, the image reading apparatus 200 includes a plurality of conveyance roller pairs (201, 202, 203, 204, 205, 215, 216, 217, and 218) for conveying the recording material S discharged from the image forming apparatus 100, and a duplex image reading unit 400. An inlet conveyance roller pair 201 conveys the recording material S discharged from the image forming apparatus 100 toward the duplex image reading unit 400. The duplex image reading unit 400 is a so-called document feeding-reading apparatus which reads the image while conveying the recording material S in the conveyance direction (in an arrow X direction). In this embodiment, the duplex image reading unit 400 reads the image on the front surface (the first surface) of the recording material S and thereafter the image on the back surface (the second surface) in a single conveyance. The duplex image reading unit 400 will be described in detail later.

The images on both surfaces read by the duplex image reading unit 400 are used as image data for adjustments of positions of the images formed on the front and back surfaces of the recording material S so that relative positions of the images on the front and back surfaces are not misaligned with respect to the recording material S. So as to obtain the image data, test images (test pattern) are formed on both surfaces of the recording material S, and are read by the duplex image reading unit 400. Further, since it is necessary to form the test images on a plurality of sheets of the recording material S in succession and read such images, the time required for reading the image is shortened by the document feeding-reading. To be noted, it is acceptable to perform the reading of the image by the duplex image reading unit 400 in a case where the test image is formed on the recording material S, and not to perform the reading of the image in a case where any image of a user request other than the test image is formed.

In a case where the punching process or the stapling process is performed as the post-process processing, the recording material S passed through the duplex image reading unit 400 is conveyed to the finisher apparatus 300 by an exit conveyance roller pair 205 via a through path 230. On the other hand, in a case where the punching process or the stapling process is not performed, the recording material S is discharged to a fixed tray 223 disposed on an upper surface of the image reading apparatus 200 by the plurality of discharge conveyance roller pairs (215, 216, 217, and 218) via a discharge path 232. Switching between the through path 230 and the discharge path 232 on which the recording material S is conveyed as described above is performed by a branch flapper 222.

Duplex Image Reading Unit

Figure 3:
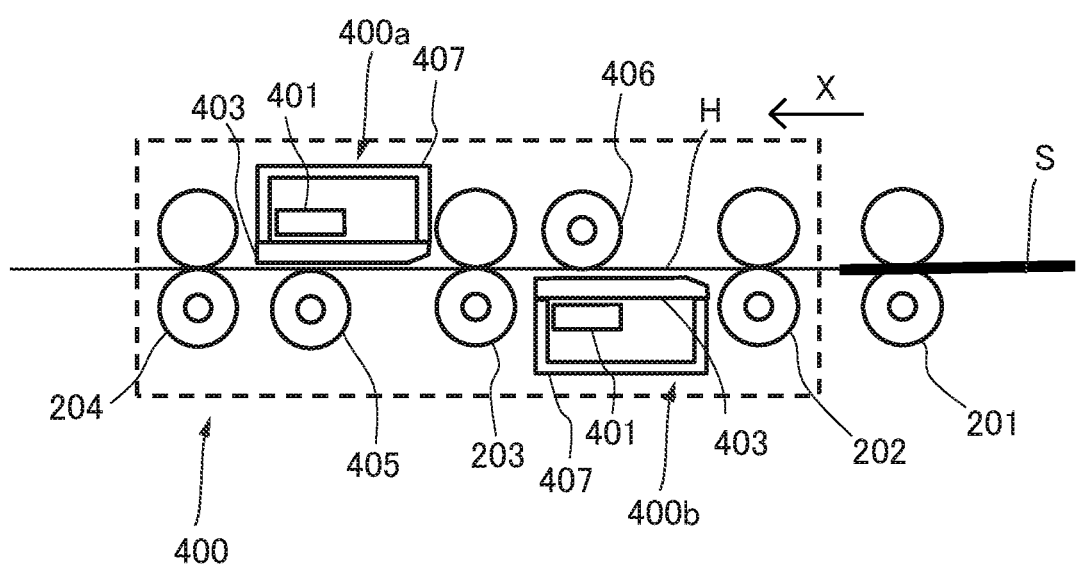
FIG. 3 is an enlarged view in which a part of the image reading apparatus is enlarged.

Next, using FIGS. 3 and 4, a configuration of the duplex image reading unit 400 will be described. To be noted, illustrations of an abutment member 409 and a compression spring 410 (refer to FIG. 4) are omitted in FIG. 3. As shown in FIG. 3, the duplex image reading unit 400 includes a plurality of reading conveyance roller pairs (202, 203, and 204), serving as conveyance units to convey the recording material S, a first CIS (contact image sensor) unit 400a, and a second CIS unit 400b. By the rotation of the plurality of reading conveyance roller pairs (202, 203, and 204), the recording material S is conveyed in the conveyance direction (arrow X direction).

In this embodiment, the first and second CIS units 400a and 400b are disposed sequentially from downstream at two separated positions facing a recording material conveyance path H through which the recording material S passes. The first (downstream side) CIS unit 400a, serving as a first reading unit, is disposed on the side in the vertically upper direction of the recording material S conveyed on the recording material conveyance path H so as to read the front surface (the first surface) of the recording material S. That is, the first CIS unit 400a is configured to read the image on the front surface of the recording material S from above in the vertical direction. On the other hand, the second (upstream side) CIS unit 400b, serving as a second reading unit, is disposed on the side in the vertically lower direction of the recording material S conveyed on the recording material conveyance path H so as to read the back surface (the second surface) of the recording material S. That is, the second CIS unit 400b is configured to read the image on the back surface of the recording material S from below in the vertical direction.

In this embodiment, the first and second CIS units 400a and 400b are the same in a configuration, and are disposed in a state vertically opposite each other across the recording material conveyance path H. That is, while arrangements of the first and second CIS units 400a and 400b with respect to the image reading apparatus 200 are different from each other, the first and second CIS units 400a and 400b are constituted by common parts. At this point, the common parts are, for example, parts which are formed or fabricated by the same dies. Therefore, so as to facilitate understanding of descriptions, the descriptions below will be provided by taking the second CIS unit 400b as an example unless otherwise specifically stated.

Figure 4:
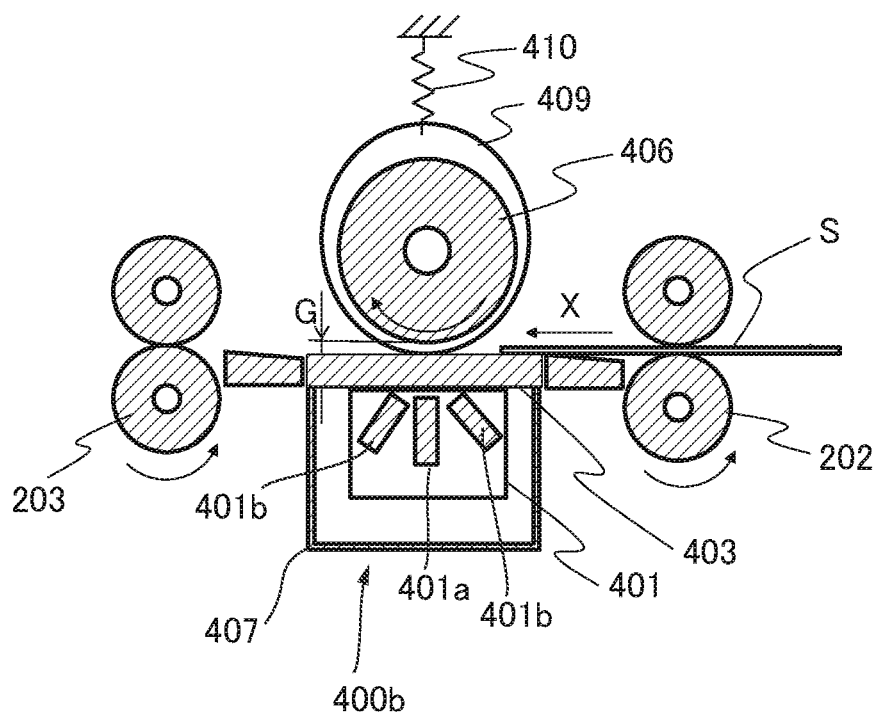
FIG. 4 is a schematic view illustrating overviews of a second CIS unit and a second backing roller.

As shown in FIG. 4, the second CIS unit 400b includes an accommodating case 407, serving as a housing, a CIS 401 which is, for example, a contact image sensor of a unit-magnification optical system, and a reading glass (contact glass) 403. The CIS 401, serving as an optical reading unit, irradiates light from an LED (light emitting diode) array 401a, that is a light source, to the recording material S conveyed on the recording material conveyance path H, and reads the image on the recording material S by forming the image on a sensor element 401b (such as a photoelectric conversion element) from the reflected light reflected in the recording material S. The LED array 401a is disposed in a width direction intersecting with the conveyance direction of the recording material S in a vertical direction, and irradiates the light so that the intensity of light irradiation is approximately uniform in the width direction. Further, the sensor element 401b is a plurality of line sensors disposed in the width direction, and reads the image formed on the recording material S, which is conveyed, by one line at a time. The CIS 401 is accommodated inside the accommodating case 407. The width direction above is an arrangement direction of the LED array 401a and a line direction of the sensor element 401b.

The reading glass 403, serving as a transparent member, is mounted on a side facing the recording material S conveyed on the recording material conveyance path H in the accommodating case 407, and transmits the irradiated light irradiated from the LED array 401a toward the recording material S and the reflected light reflected in the recording material S in response to the irradiation of the light. That is, in the second CIS unit 400b, the image on the recording material S conveyed on the recording material conveyance path H is read via the reading glass 403. A mounting configuration of the reading glass 403 with respect to the accommodating case 407 will be described later (refer to FIGS. 5 to 7). In this embodiment, the CIS 401 and the reading glass 403 are disposed detachably from the accommodating case 407 so that a worker such as a service person is able to detach the reading glass 403 from the accommodating case 407 and replace the reading glass 403, which has been damaged, or the CIS 401, which has been broken.

Returning to FIG. 3, the duplex image reading unit 400 further includes a first backing roller 405, serving as a first guide portion, and a second backing roller 406, serving as a second guide portion. The first backing roller 405 is disposed by leaving a space (gap) with the first CIS unit 400a in the vertically lower direction, and the second backing roller 406 is disposed by leaving a space (gap) with the second CIS unit 400b in the vertically upper direction. The first CIS unit 400a reads the image on the front surface of the recording material S when the recording material S passes through the gap formed between the reading glass 403 and the first backing roller 405. The second CIS unit 400b reads the image on the back surface of the recording material S when the recording material S passes through the gap formed between the reading glass 403 and the second backing roller 406.

The first and second backing rollers 405 and 406 are driven by a backing motor, not shown, and rotatably driven at the same peripheral speed as the reading conveyance roller pairs (202, 203, and 204). Thus, by not causing differences in the speeds among the first and second backing rollers 405 and 406, which rotate, and the recording material S, which is conveyed, it is possible to prevent the image on the recording material S from falling into a rubbing state. Further, since rubbing does not occur on the image, it is possible to reduce the soiling by the toner caused by the rubbing of the image. To be noted, the gap mentioned above, through which the recording material S passes, is set at an appropriate size so as to pass through the recording material S depending on a type of the recording material S as described later, so that the first and second backing rollers 405 and 406 do not actively convey the recording material S.

In this embodiment, the first and second backing rollers 405 and 406 are the same in a configuration. Therefore, descriptions will be provided by taking the second backing roller 406 as an example herein. As shown in FIG. 4, at the second backing roller 406 rotatably supported by bearings, not shown, abutment members 409 and 409 for a gap adjustment are disposed on the bearings at both ends in a rotational axis direction (width direction). The abutment member 409 is urged toward the reading glass 403 by the compression spring 410 so as to abut on the reading glass 403. Thus, it is possible to move the second backing roller 406 toward the reading glass 403 with the bearing along with a movement of the abutment member 409, which is caused by the urging. Then, when the abutment member 409 abuts on the reading glass 403, the second backing roller 406 is positioned at a position to form the gap G, which becomes a conveyance path of the recording material S, with the reading glass 403. To be noted, it is acceptable that the first and second backing rollers 405 and 406 are guide members that do not rotate.

The abutment member 409, serving as a change unit, is rotatably disposed on the bearing so that it is possible to change the size of the gap G, that is, a space of the conveyance path formed between the second backing roller 406 and the reading glass 403. For example, the abutment member 409 is formed in an elliptical shape or in an eccentric polygonal shape in which a length from the center to each side is different. By rotating the abutment member 409 around the bearing, the second backing roller 406, together with the bearing, approaches to and is separated from the reading glass 403 so that the size of the gap G changes. The abutment member 409 is, for example, formed in a shape which is capable of changing the size of the gap G in ten steps. To cite an example, the abutment member 409 is formed to have different radii of ten steps, for example, 10.25, 10.35, 10.45, 10.65, . . . , and 11.50 mm (millimeter).

The size of the gap G above is determined by a focal depth of the CIS 401 and the type of the recording material S (more particularly, the thickness determined depending on grammage). That is, the size of the gap G is set at larger than the thickness of the recording material S so that the recording material S does not block (so-called jam) the gap G by the thickness of the recording material S during conveyance and, further, the recording material S is able to enter the gap G smoothly. However, the size of the gap G is limited to a level of a size at which the recording material S is not conveyed in a manner deviating from the focal depth of the CIS 401 so that the CIS 401 is able to read the image on the recording material S even if the recording material S flaps during the conveyance. That is, the size of the gap G is set at a size at which the size of the gap G is larger than the thickness of the recording material S and is smaller than a sum of the thickness of the recording material S and the focal depth of the CIS 401.

For example, in a case where the CIS 401 with the focal depth of 0.45 mm is used, if the thickness of the recording material S is less than 0.1 mm (grammage is less than 100 g/m$^2$ (grams per square meter)), the size of the gap G is set at 0.3 mm. In this case, when the recording material S enters the gap G between the second backing roller 406 and the reading glass 403, since a gap of 0.2 mm (difference between the size of the gap G and the thickness of the recording material S) is produced, the recording material S enters the gap G smoothly, and is conveyed without blocking the gap G.

Mounting Configuration of Reading Glass

Figure 5:
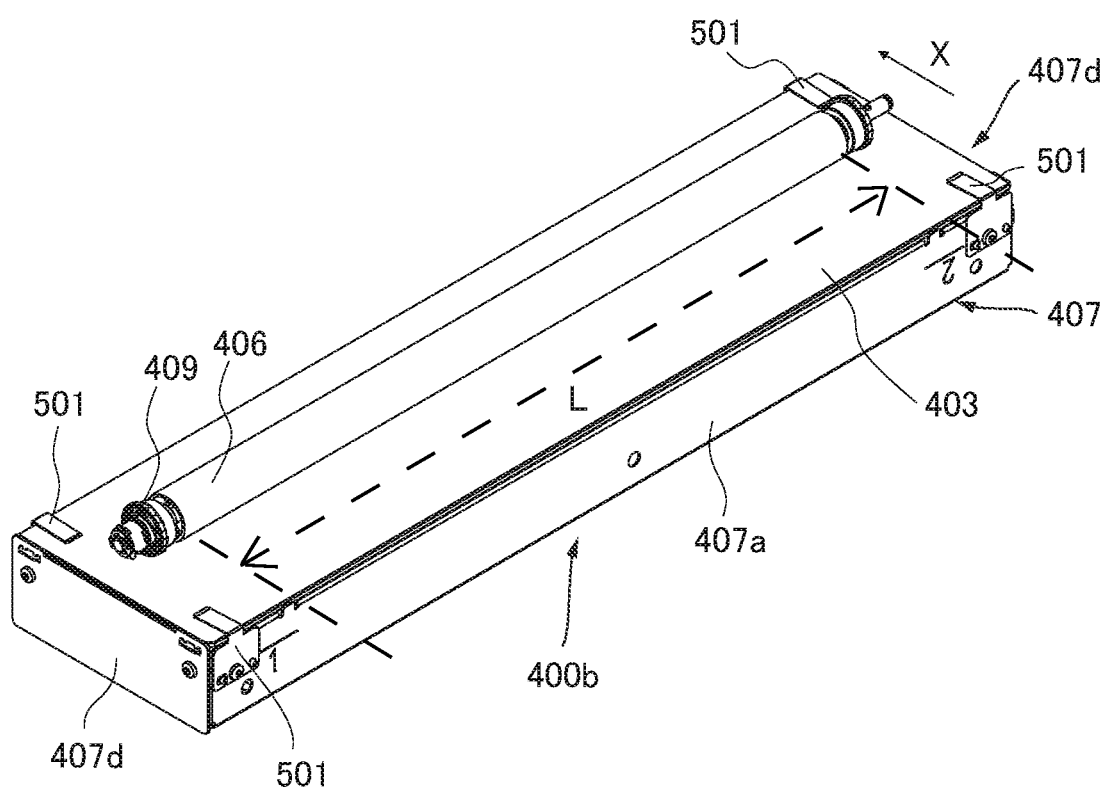
FIG. 5 is a perspective view showing the second CIS unit and the second backing roller.

Next, using FIGS. 5 to 7, a mounting configuration of the reading glass 403 onto the accommodating case 407 will be described. As shown in FIG. 5, the reading glass 403 is fixed to the accommodating case 407 by 4 pieces of plate springs 501 disposed on sides of both ends from the center in the width direction (longitudinal direction of the reading glass 403) and upstream and downstream sides in the conveyance direction of the accommodating case 407. The reading glass 403 also serves as a conveyance guide, and the recording material S is conveyed on a surface of the reading glass 403. Therefore, if the plate spring 501 is disposed in a conveyance area L where a maximum conveyable size of the recording material S in the longitudinal direction of the reading glass 403 is conveyed, there is a risk of causing the damage to the recording material S by the plate spring 501. Accordingly, it is not possible to dispose the plate spring 501 in the conveyance area L, where the recording material S is conveyed, in the width direction (longitudinal direction of the reading glass 403). Therefore, 4 pieces of plate springs 501 are disposed outside the conveyance area L of the accommodating case 407 (on the sides of the ends in the width direction).

Figure 6:
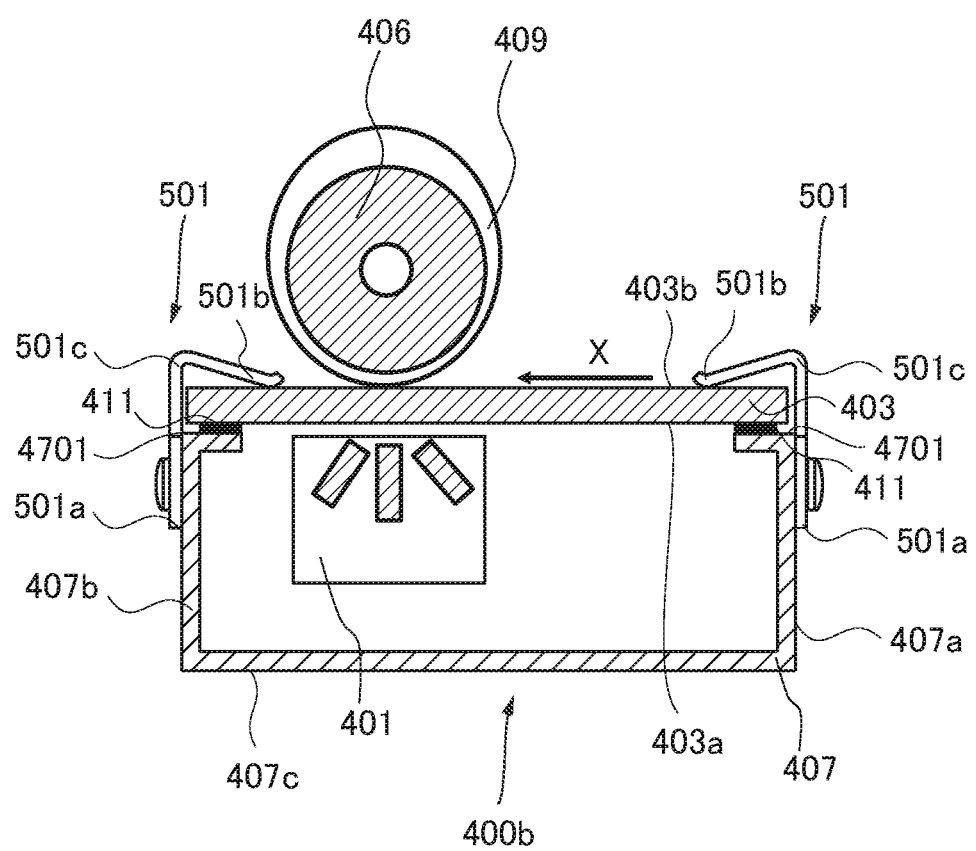
FIG. 6 is a cross-sectional view illustrating a mounting configuration of a reading glass.

As shown in FIG. 6, each of the plate springs 501 includes a fixed portion 501a fixed to the accommodating case 407, a pressing portion 501b pressing the reading glass 403, and an urging portion 501c bending from the fixed portion 501a and urging the pressing portion 501b toward the reading glass 403. The accommodating case 407 includes a bottom surface portion 407c, a first wall portion 407a standing on an upstream side of the bottom surface portion 407c, and a second wall portion 407b standing on a downstream side of the bottom surface portion 407c opposite the first wall portion 407a. Each of the plate springs 501 disposed on the upstream side of the accommodating case 407 is fixed to the first wall portion 407a by a screw or the like via the fixed portion 501a, and each of the plate springs 501 disposed on the downstream side of the accommodating case 407 is fixed to the second wall portion 407b by the screw or the like via the fixed portion 501a. To be noted, this is not limited to this, and it is acceptable to fix the plate springs 501 to each of both end wall portions 407d and 407d (refer to FIG. 5) standing at both ends of the accommodating case 407 opposite each other in the width direction via the fixed portions 501a.

In this embodiment, as described above, the first and second CIS units 400a and 400b that are the same in the configuration are disposed vertically opposite each other across the recording material conveyance path H (refer to FIG. 3). Therefore, especially for the first CIS unit 400a, fixing the reading glass 403 to the accommodating case 407 by adhesive, double-sided tape, or the like so as to prevent the reading glass 403 from falling down is considered. However, in a case where the reading glass 403 is fixed by the adhesive, the double-sided tape, or the like, it becomes difficult for the worker to detach the reading glass 403 from the accommodating case 407 and perform a maintenance work such as the replacement of the reading glass 403 or the CIS 401. Therefore, it is appropriate to fix the reading glass 403 to the accommodating case 407 by the plate spring 501 as describe above so that the worker is able to detach the reading glass 403 from the housing case 407 easily. To be noted, in the case of this embodiment, the plate springs 501 serve as a first pressing member and a second pressing member (third pressing member, fourth pressing member) pressing the reading glass 403 outside the conveyance area L of the accommodating case 407.

As shown in FIG. 6, the reading glass 403 is detachably nipped by the plate springs 501 with the first wall portion 407a (similar also on a side of the second wall portion 407b). In this embodiment, 4 pieces of contact supporting portions 411 supporting the reading glass 403 by coming into contact with the reading glass 403 are disposed on the sides of both ends of each of the first and second wall portions 407a and 407b in the width direction. As shown in FIG. 7, similar to the plate springs 501, the contact supporting portions 411 are disposed outside the conveyance area L (on the side of the end) of the accommodating case 407. Therefore, the plate springs 501 press the reading glass 403 from a side of an opposite surface 403b (opposite surface side) opposite a contact surface 403a with which the contact supporting portions 411 come into contact. However, the plate springs 501 are disposed to press the reading glass 403 inside contact positions at which the contact supporting portions 411 come into contact with the reading glass 403 (refer to FIG. 9B). In the case of this embodiment, at a first end of the reading glass 403 in the longitudinal direction, the plate springs 501 on one side press the reading glass 403 toward the accommodating case 407 inside the contact supporting portions 411 and from a side of the opposite surface 403b opposite the contact surface 403a with which the contact supporting portions 411 come into contact. Further, at a second end of the reading glass 403 in the longitudinal direction, the plate springs 501 on the other side press the reading glass 403 toward the accommodating case 407 inside the contact supporting portions 411 and from the side of the opposite surface 403b.

Figure 7:
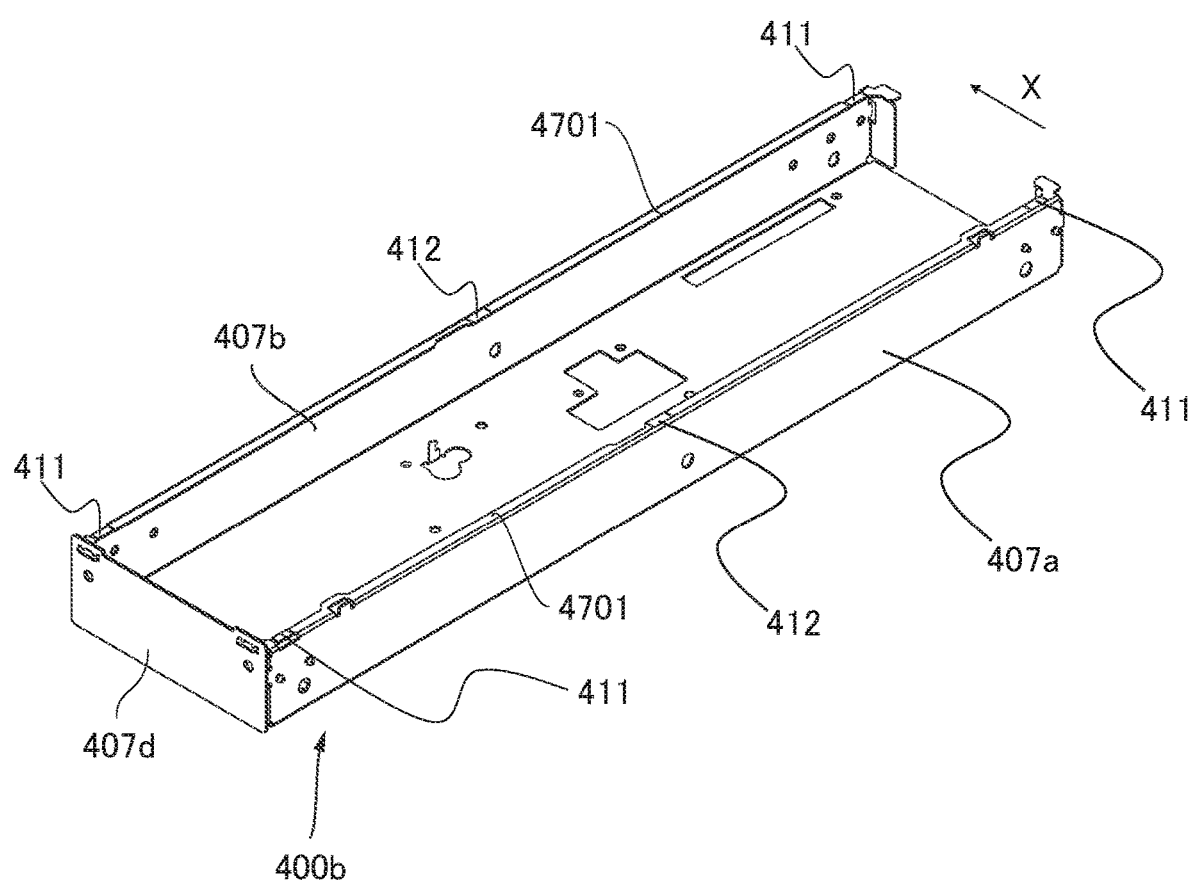
FIG. 7 is a perspective view showing the second CIS unit with the reading glass removed.

As shown in FIGS. 6 and 7, the contact supporting portions 411 are, for example, integrally formed by drawing at a time of manufacturing the accommodating case 407 from a galvanized steel sheet by presswork so as to protrude from an opposite glass surface 4701 of each of the first and second wall portions 407a and 407b. The reading glass 403 is not supported on whole surfaces of the opposite glass surface 4701 (frame surface) of each of the first and second wall portions 407a and 407b, but supported by four pieces of the contact supporting portions 411 protruding from the frame surfaces on the first and second wall portions 407a and 407b (four-point supporting). Thus, it is possible to more accurately define a mounting position of the reading glass 403 with respect to the accommodating case 407 (in more particular, with respect to the CIS 401 mounted to the accommodating case 407), which affects the reading of the image by the CIS 401. To be noted, the opposite glass surface 4701 is a portion opposite the reading glass 403 at a distance in comparison with the contact supporting portions 411 and an opposite supporting portion 412 described later.

That is, in a case where the second CIS unit 400*b* is manufactured by mounting the reading glass 403 with a length of 400 mm in the width direction onto the accommodating case 407, it is difficult to confine an error of a height position of the reading glass 403 with respect to the accommodating case 407 within 0.1 mm. This is, for example, because of a difficulty to confine the flatness of the frame surfaces of the first and second wall portions 407*a* and 407*b* of the accommodating case 407 within 0.1 mm. Therefore, the reading glass 403 is partially supported by the contact supporting portions 411, not by the whole surface of the frame surfaces, and pressed by the plate springs 501 from the opposite surface 403*b*. Herewith, the reading glass 403 is mounted onto the accommodating case 407 at a height corresponding to the focal depth of the CIS 401. Thus, the contact supporting portions 411 on one side protrude from the opposite glass surface 4701 opposite the reading glass 403 of the accommodating case 407, and come into contact with the reading glass 403 on one side outside the conveyance area L, in which the recording material S is conveyed, in the longitudinal direction of the reading glass 403. The contact supporting portions 411 on the other side protrude from the opposite glass surface 4701 opposite the reading glass 403 of the accommodating case 407, and come into contact with the reading glass 403 on the other side outside the conveyance area L, in which the recording material S is conveyed, in the longitudinal direction of the reading glass 403. In the case of this embodiment, the contact supporting portions 411 serve as a first contact portion and a second contact portion (third contact portion, fourth contact portion) coming into contact with both end portions of the reading glass 403 outside the conveyance area L of the accommodating case 407.

Further, in this embodiment, as shown in FIG. 7, each of the opposite supporting portions 412 is disposed in the center of each of the first and second wall portions 407*a* and 407*b* in the longitudinal direction as a protruding portion protruding from each end of the first and second wall portions 407*a* and 407*b*. That is, the opposite supporting portion 412 is disposed inside the conveyance area L (within the conveyance area) of the reading glass 403 in the longitudinal direction opposite the reading glass 403, and includes an opposite surface 412*a* opposite the contact surface 403*a* (refer to FIG. 3) of the reading glass 403, with which the contact supporting portion 411 comes into contact. The opposite surface 412*a* of the opposite supporting portion 412 comes into contact with the contact surface 403*a* with the reading glass 403 bending, and does not come into contact with the contact surface 403*a* with the reading glass 403 not bending. Details of this opposite supporting portion 412 will be described later (refer to FIG. 9B).

Figure 8A:
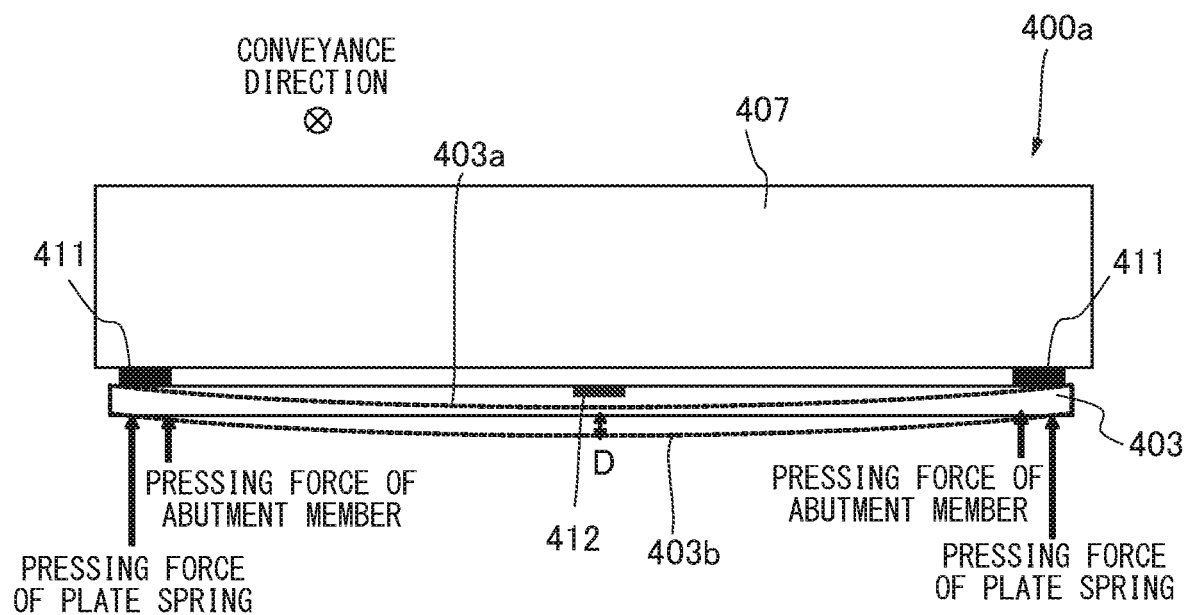
FIG. 8A is a diagram showing a comparative example to explain the suppression of the bending which possibly occurs in a reading glass of a first CIS unit.
Figure 8B:
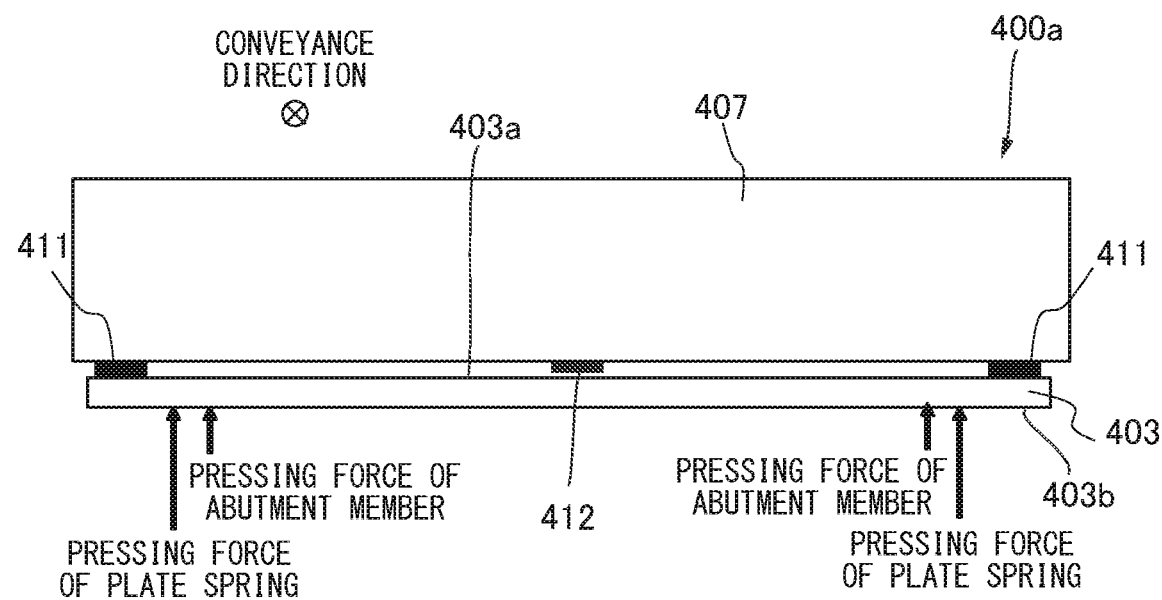
FIG. 8B is a diagram showing this embodiment to explain the suppression of the bending which possibly occurs in the reading glass of the first CIS unit.
Figure 9A:
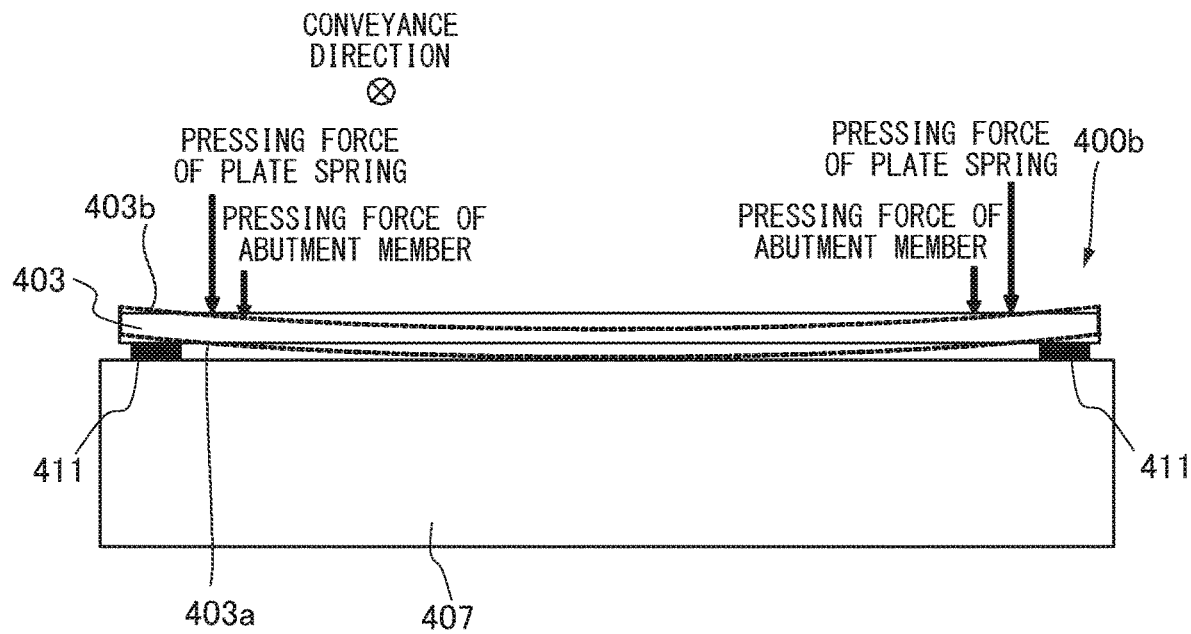
FIG. 9A is a diagram to explain the suppression of the bending which possibly occurs in the reading glass of the second CIS unit, and a diagram showing the comparative example without an opposite supporting portion.
Figure 9B:
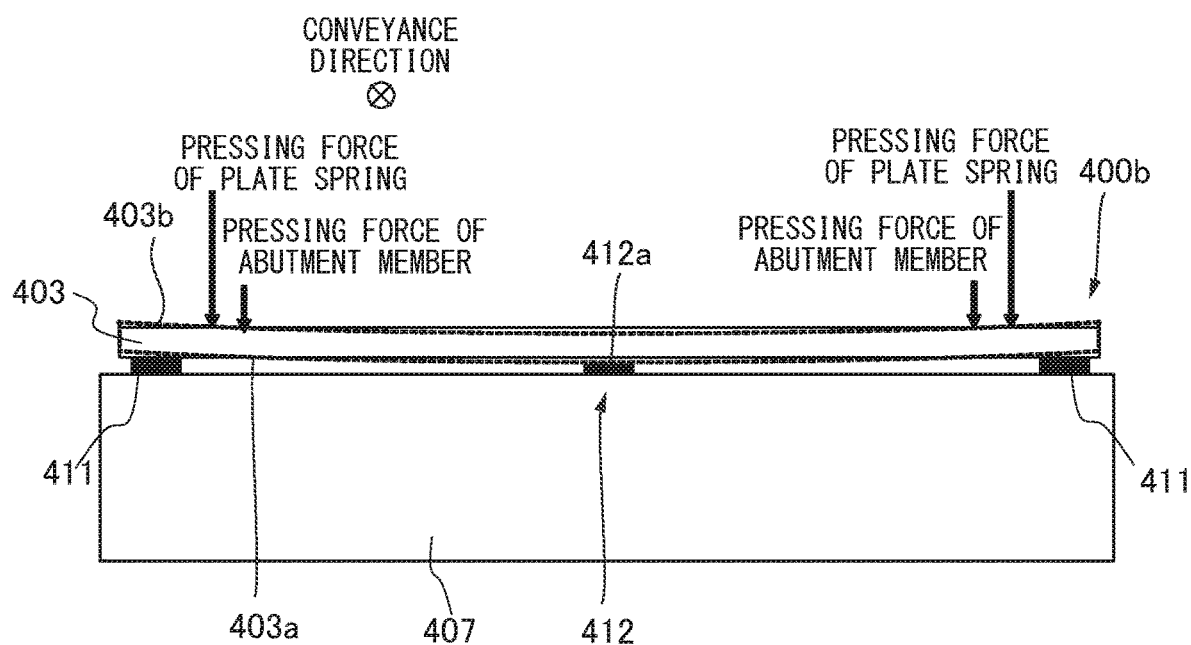
FIG. 9B is a diagram illustrating the suppression of the bending which possibly occurs in the reading glass of the second CIS unit, and a diagram showing this embodiment including the opposite supporting portion.

Incidentally, the reading glass 403 is, in comparison with a length in the width direction, short in the conveyance direction of the recording material S. In this embodiment, the reading glass 403 in a rectangular shape with a length of 400 mm in the width direction (longitudinal direction) and a length of 100 mm in the conveyance direction (short direction) is used. At this point, in this embodiment, the rectangular shape does not necessarily include a square corner portion. For example, even if the reading glass is an approximately rectangular shape with a chamfered corner portion, or even if any of sides is slanting, a shape having a long side and a short side is considered to be the rectangular shape. Since the reading glass 403 in the rectangular shape is used as described above, the reading glass 403 easily bends in the longitudinal direction in a case where the reading glass 403 is supported partially not by whole surface of the frame surface but by the contact supporting portions 411 as described above. Further, since the thickness of the reading glass 403 is formed thin (for example, 3 mm), the reading glass 403 more easily bends in the longitudinal direction. Using FIGS. 8A and 8B, the suppression of possible bending in the reading glass 403 in the first CIS unit 400*a* will be described. FIG. 8A shows a comparative example, and FIG. 8B shows this embodiment. Further, using FIGS. 9A and 9B, the restriction of the possible bending in the reading glass 403 in the second CIS unit 400*b* by the opposite supporting portion 412 will be described. FIG. 9A shows the comparative example without the opposite supporting portion, and FIG. 9B shows this embodiment with the opposite supporting portion.

In a case of the comparative example shown in FIG. 8A, the reading glass 403 receives the pressing force by the abutment member 409 and the pressing force by the plate spring 501 at positions on the opposite surface 403*b* of the reading glass 403 opposite the contact supporting portions 411. That is, the reading glass 403 receives the pressing force by the abutment member 409 and the pressing force by the plate spring 501 at positions close to both ends in the width direction. In this case, the bending occurs in the center portion of the reading glass 403 in the width direction by own weight. While the resultant force of the pressing force by the abutment member 409 and the pressing force by the plate spring 501 described above acts in an opposite direction of a direction in which the reading glass 403 bends by the own weight, it is because the resultant force does not adequately suppress the bending by the own weight in the center portion in the width direction. In a case where the length of the reading glass 403 in the width direction is 400 mm, approximately 0.3 mm level of the bending at most occurs by the own weight in the center portion of the reading glass 403 in the width direction.

In a state where approximately 0.3 mm level of the bending occurs in the reading glass 403, even if the size of the gap G is set at 0.3 mm, a size of a gap becomes 0 mm in the center portion. That is, since the gap formed between the reading glass 403 and the first backing roller 405 disappears, the gap is blocked by the recording material S. Therefore, for example, so as to prevent the recording material S from blocking, an increase in the size of the gap G (for example, 0.6 mm) based on an assumption of the bending of the reading glass 403 is considered. However, in such a case, there is a risk that the recording material S flaps on the sides of both ends, where an amount of the bending of the reading glass 400 is small, and the defective reading of the image by the CIS 401 occurs. That is, in general, the focal depth of the CIS 401 is 0.3 to 0.5 mm level. Therefore, in a case where the size of the gap G is set at 0.6 mm, the recording material S in the conveyance easily deviates from the focal depth at both ends in the width direction, and the image read by the CIS 401 becomes in a so-called blurred state (unfocused state).

Taking into consideration the above, in this embodiment, as shown in FIG. 8B, the reading glass 403 receives the pressing force by the abutment member 409 and the pressing force by the plate spring 501 at positions on the opposite surface 403*b* inside the contact supporting portions 411. Herewith, since the bending by the own weight is canceled by the resultant force of the pressing force by the abutment member 409 and the pressing force by the plate spring 501, it is possible to suppress the occurrence of the bending in the reading glass 403. To be noted, since it is acceptable if the bending in the reading glass 403 produced by the own weight is canceled, it is acceptable if the resultant force of the pressing force by the abutment member 409 and the pressing force by the plate spring 501 is received at the positions on the opposite surface 403b inside the contact supporting portions 411. For example, it is not limited to the example shown in FIG. 8B, and it is acceptable that, while the pressing force by the abutment member 409 is received at the positions inside the contact supporting portions 411, the pressing force by the plate spring 501 is received at positions opposite the contact supporting portions 411. To be noted, in the case of the first CIS unit 400a, since the bending is not produced in the reading glass 403, the opposite supporting portion 412 does not come into contact with the contact surface 403a of the reading glass 403.

However, as described above, in this embodiment, the first and second CIS units 400a and 400b constituted by the common parts are disposed vertically opposite each other across the recording material conveyance path H (refer to FIG. 3). That is, the reading glass 403 and the accommodating case 407 constituting each of the first and second CIS units 400a and 400b use the common parts of the same shape in the first and second CIS units 400a and 400b. Therefore, as shown in FIG. 9A, in the second CIS unit 400b, a bending direction of the reading glass 403 by the own weight is the same as a bending direction of the reading glass 403 by the resultant force of the pressing force by the abutment member 409 and the pressing force by the plate spring 501 (downward in the gravity direction). As a result, since a bending amount of the reading glass 403 becomes larger than a bending amount by the own weight, there is a risk that the size of the gap G accordingly becomes larger than a size corresponding to the focal depth (for example, 0.5 mm) of the CIS 401 so that the defective reading of the image by the CIS 401 occurs.

Therefore, in this embodiment, as shown in FIG. 9B, the opposite supporting portion 412 restricting the bending of the reading glass 403 is disposed in the accommodating case 407 so that the size of the gap G does not become larger than the size corresponding to the focal depth of the CIS 401. The opposite supporting portion 412 includes the opposite surface 412a which is, when viewed from an upstream side in the conveyance direction, opposite the contact surface 403a and closer to the accommodating case 407 than contact positions (height) at which the contact supporting portions 411 come into contact with the reading glass 403. For example, a protruding amount of the opposite supporting portion 412 from the frame surface is formed smaller than protruding amounts of the contact supporting portions 411 so that a difference between the contact positions of the contact supporting portions 411 coming into contact with the reading glass 403 and the opposite surface 412a becomes equal to or more than 0.1 mm and equal to or less than 0.2 mm. That is, in a case where the second CIS unit 400b is viewed from the upstream side in the conveyance direction, the opposite surface 412a serving as a top of the opposite supporting portion 412 is disposed at a position lower than the contact surfaces (top) of the contact supporting portions 411 coming into contact with the reading glass 403. In other words, the opposite surface 412a of the opposite supporting portion 412 is disposed lower than an imaginary line connecting two contact points of the contact supporting portions 411 on the reading glass 403.

This difference in the position between the opposite surface 412a and the contact positions of the contact supporting portions 411 coming into contact with the reading glass 403 is set at a different value depending on the focal depth of the CIS 401. Further, so as to reduce the variance among sheets of the recording material S, the first CIS unit 400a on the downstream side is disposed by bringing the first CIS unit 400a close to the second CIS unit 400b on the upstream side as much as possible. In such a case, when the reading glass 403 bends upwards in the second CIS unit 400b, the conveyance path from the second CIS unit 400b to the first CIS unit 400a is narrowed, and affects the conveyance in the first CIS unit 400a. So as to avoid this, the protruding amount of the opposite supporting portion 412 from the frame surface is formed smaller than the protruding amounts of the contact supporting portions 411. However, since there is a risk that the reading of the image by the CIS 401 is not performed appropriately if the difference in the positions between the opposite surface 412a and the contact positions at which the contact supporting portions 411 come into contact with the reading glass 403 is larger than 0.2 mm, the difference above is set at equal to or more than 0.1 mm and equal to or less than 0.2 mm.

As described above, while the reading glass 403 bends downwards in the gravity direction in the second CIS unit 400b, the reading glass 403 that has bent is supported by coming into contact with the opposite supporting portion 412. In a case where the difference above is, for example, set at 0.2 mm, since the bending of the reading glass 403 is restricted to 0.2 mm, while the size of the gap G becomes 0.5 mm (in the center portion) at most, this is within a range (0.3 mm to 0.5 mm) of the focal depth of the CIS 401. Therefore, the reading of the image by the CIS 401 is not affected.

As described above, in this embodiment, the bending of the reading glass 403 by the own weight is canceled by the abutment member 409 and the plate spring 501 in the first CIS unit 400a. Further, in the second CIS unit 400b, the bending of the reading glass 403 is restricted by supporting the reading glass 403, which is bent by the own weight, the abutment member 409, and the plate spring 501, by the opposite supporting portion 412 so that the reading glass 403 does not bend further. Herewith, it is possible to suppress narrowing of the gaps G formed between the first backing roller 405 and the reading glass 403 in the first CIS unit 400a and formed between the second backing roller 406 and the reading glass 403 in the second CIS unit 400b. Therefore, even in a case where the first and second CIS units 400a and 400b constituted by the common parts are disposed vertically opposite each other across the recording material conveyance path H, it is possible to read the images on both surfaces of the recording material S appropriately by each of the CIS 401.

By this disclosure, it is possible to provide the image reading apparatus capable of compatibly achieving suppression of defective conveyance due to the bending of the transparent member and improvement in precision of the reading of the image.

OTHER EMBODIMENTS

In this embodiment, for example, the accommodating case 407 is manufactured by performing the presswork of the galvanized steel sheet with a thickness of 0.8 mm, and the contact supporting portions 411 and the opposite supporting portion 412 are formed by the drawing. Theoretically, it is possible to obtain the effect described above by setting the protruding amount of the contact supporting portion 411 at 0.1 mm and setting the protruding amount of the opposite supporting portion 412 at 0 mm, that is, without forming the opposite supporting portion 412. However, since, even if processed with high accuracy, the protruding amount of the contact supporting portion 411 becomes a level of 0.1 mm±0.1 mm and, in addition, it is difficult to bring the flatness of the frame surface to less than 0.1 mm, the formation of the opposite supporting portion 412 is preferred.

Figure 10:
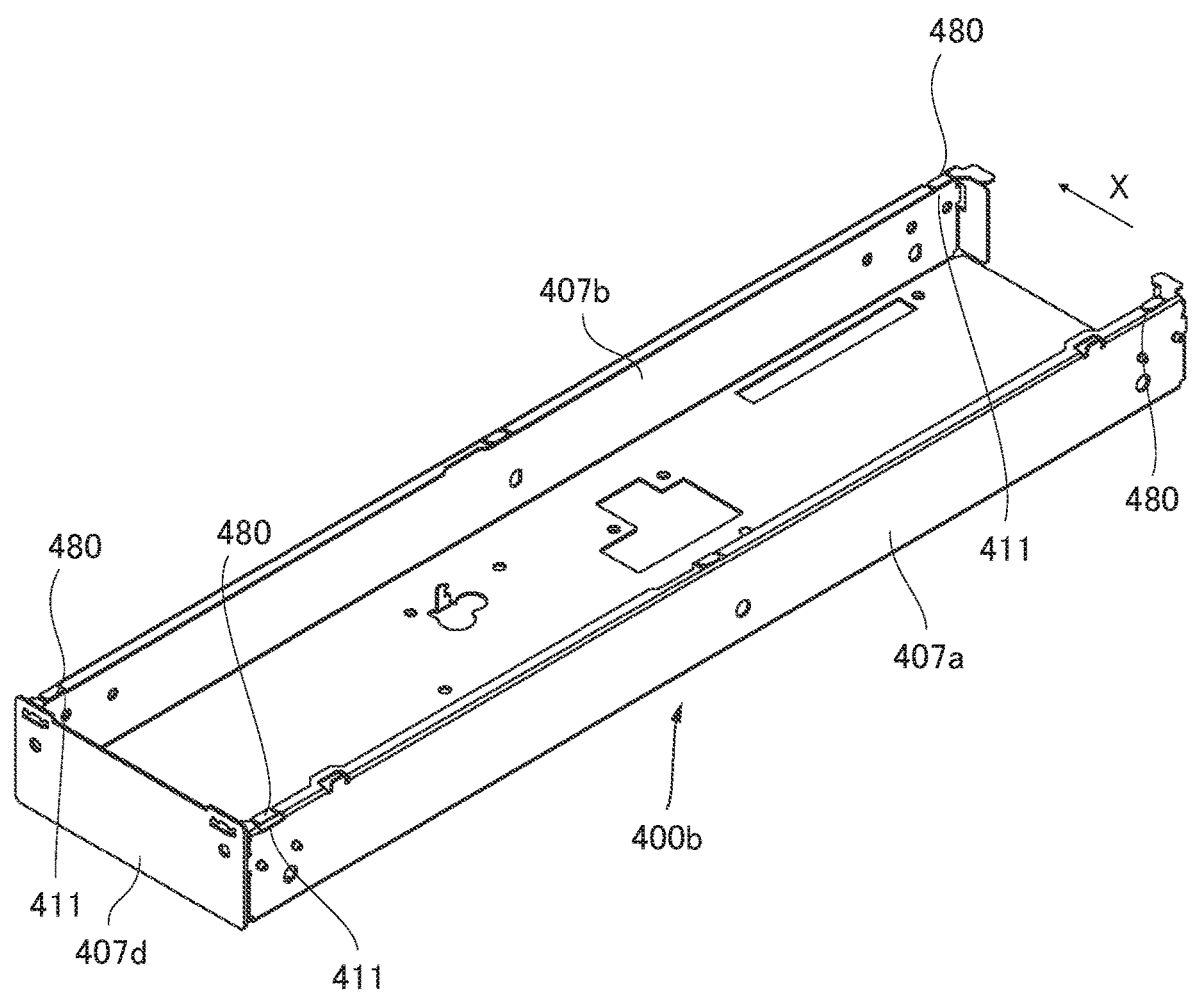
FIG. 10 is a diagram illustrating a case where a spacer is used.

Further, as shown in FIG. 10, it is preferable that the difference of the positions between the opposite surface 412a and the contact positions at which the contact supporting portions 411 come into contact with the reading glass 403 becomes adjustable at equal to more than 0.1 mm and equal to or less than 0.2 mm by stacking one or a plurality of pieces of a spacer 480 having a predetermined thickness on each of the opposite surface 412a and the contact supporting portions 411. In this case, it is preferable to change a number of pieces of the spacer 480 stacked on each of the opposite surface 412a and the contact supporting portions 411 taking into consideration a variance in the flatness of the frame surface. To be noted, while it is acceptable to manufacture the accommodating case 407 by resin molding, properties of the frame surface manufactured by the resin molding is likely to cause variations in comparison with a case made of a plate shaped metal member. Therefore, in a case of the accommodating case 407 manufactured by the resin molding, especially, it is preferable that the difference mentioned above is adjustable by changing the number of pieces of the spacer 480 stacked on each of the opposite surface 412a and the contact supporting portions 411.

To be noted, it is preferable that a gap between the accommodating case 407 and the reading glass 403 is covered in a manner encircling the gap by a sponge and the like so that foreign substances such as the paper dust produced by the conveyance of the recording material S does not enter inside the accommodating case 407.

To be noted, in the embodiment described above, the descriptions have been provided by taking the configuration, in which the image reading apparatus 200 is coupled to the image forming apparatus 100, as an example, it is not limited to this. For example, a configuration in which, inside the apparatus body 100A of the image forming apparatus 100, the duplex image reading unit 400 (refer to FIG. 2) is disposed on the discharge conveyance path 150 downstream of the fixing unit 800 in the conveyance direction is acceptable. Further, it is acceptable that a conveyance apparatus including the other casing is coupled to between the image forming apparatus 100 and the image reading apparatus 200.

To be noted, while, in the embodiment described above, the descriptions are provided using the image forming apparatus 100 of the electrophotographic system, in place of this, for example, it is acceptable to use an image forming apparatus of a thermal drying system such as an ink jet printer and a sublimation type printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-201382, filed Dec. 3, 2020, which is hereby incorporated by reference herein in its entirety.

What is claimed is:

1. An image reading apparatus configured to read an image formed by an image forming unit forming the image on a recording material and disposed downstream of the image forming unit in a conveyance direction of the recording material, the image reading apparatus comprising:
a conveyance unit configured to convey the recording material;
a first reading unit configured to read the image on a first surface of the recording material from above in a vertical direction;
a first guide portion disposed interspatially below in the vertical direction with respect to the first reading unit and forming a conveyance path of the recording material with the first reading unit;
a second reading unit configured to read the image on a second surface opposite the first surface of the recording material from below in the vertical direction; and
a second guide portion disposed interspatially above in the vertical direction with respect to the second reading unit and forming a conveyance path of the recording material with the second reading unit,
wherein the second reading unit comprises:
a rectangular transparent member;
an optical reading unit configured to read the image by irradiating light onto the second surface of the recording material via the transparent member;
a housing comprising a facing surface facing the transparent member and accommodating the optical reading unit with the transparent member;
a first contact portion protruding from the facing surface of the housing and coming into contact with the transparent member on a side of a first end separated from a center in a longitudinal direction of the transparent member;
a second contact portion protruding from the facing surface of the housing and coming into contact with the transparent member on a side of a second end opposite the first end in the longitudinal direction of the transparent member;
a first pressing member pressing an opposite surface opposite a contact surface of the transparent member toward the housing at a position closer to the center than the first contact portion in the longitudinal direction of the transparent member, the contact surface being a surface on which the first contact portion comes into contact with the transparent member;
a second pressing member pressing the opposite surface of the transparent member toward the housing at a position closer to the center than the second contact portion in the longitudinal direction of the transparent member; and
a protruding portion, in a case where viewed from an upstream side in the conveyance direction of the recording material passing through the conveyance path between the second reading unit and the second guide portion, disposed between the first contact portion and the second contact portion and protruding from the facing surface of the housing, a protruding amount of the protruding portion being smaller than protruding amounts of the first contact portion and the second contact portion.

2. The image reading apparatus according to claim 1, wherein the first pressing member and the second pressing member press the transparent member in areas outside a conveyance area in which the recording material is conveyed in the longitudinal direction of the transparent member.

3. The image reading apparatus according to claim 1, wherein, in a case where viewed from the upstream side in the conveyance direction, the protruding portion is formed such that differences between the protruding amount of the protruding portion and the protruding amounts of the first contact portion and the second contact portion are equal to or more than 0.1 mm and equal to or less than 0.2 mm to come into contact with the transparent member in a case where the transparent member bends.

4. The image reading apparatus according to claim 1, wherein, in a case where viewed from the upstream side in the conveyance direction, a top of the protruding portion is disposed at a position lower than a first contact position and a second contact position in the vertical direction, the first contact position being a position at which the first contact portion comes into contact with the contact surface, the second contact position being a position at which the second contact portion comes into contact with the contact surface.

5. The image reading apparatus according to claim 1,
wherein the housing comprises a bottom surface portion, a first wall portion standing on an upstream side of the bottom surface portion in the conveyance direction, and a second wall portion standing on a downstream side of the bottom surface portion in the conveyance direction, and
wherein the first contact portion, the second contact portion, and the protruding portion are disposed on the first wall portion.

6. The image reading apparatus according to claim 5, wherein the first contact portion, the second contact portion, and the protruding portion are integrally formed with the first wall portion by presswork when the housing is formed from a plate shaped material made of metal.

7. The image reading apparatus according to claim 1, wherein the first pressing member comprises a plate spring comprising a fixed portion fixed to the housing, a pressing portion pressing the transparent member, and an urging portion bent from the fixed portion and urging the pressing portion toward the transparent member.

8. The image reading apparatus according to claim 1,
wherein the housing comprises a first facing surface and a second facing surface, the first facing surface facing the transparent member along the longitudinal direction of the transparent member on a side of a first end separated from a center in a short direction of the transparent member, the second opposite surface facing the transparent member along the longitudinal direction of the transparent member on a side of a second end, opposite the first end, separated from the center in the short direction of the transparent member,
wherein the facing surface is the first facing surface and the protruding portion is a first protruding portion, and
wherein the second reading unit further comprises:
a third contact portion protruding from the second facing surface of the housing and coming into contact with the transparent member on the side of the first end separated from the center in the longitudinal direction of the transparent member;
a fourth contact portion protruding from the second facing surface of the housing and coming into contact with the transparent member on the side of the second end opposite the first end in the longitudinal direction of the transparent member;
a third pressing member pressing the opposite surface of the transparent member toward the housing at a position closer to the center than the third contact portion in the longitudinal direction of the transparent member;
a fourth pressing member pressing the opposite surface of the transparent member toward the housing at a position closer to the center than the fourth contact portion in the longitudinal direction of the transparent member; and
a second protruding portion, in a case where viewed from the upstream side in the conveyance direction, disposed between the third contact portion and the fourth contact portion and protruding from the second facing surface of the housing, a protruding amount of the second protruding portion being smaller than protruding amounts of the third contact portion and the fourth contact portion.

9. The image reading apparatus according to claim 1, further comprising a change unit abutting on the transparent member at a position of at least one of both ends of the second guide portion in the longitudinal direction of the transparent member and configured to move the second guide portion with respect to the second reading unit by rotation to change a gap formed between the second guide portion and the second reading unit.

10. The image reading apparatus according to claim 9, wherein the change unit is, in a case where viewed from the upstream side in the conveyance direction, abutting on the transparent member at a position between the first pressing member and the second pressing member.

11. The image reading apparatus according to claim 1, wherein the optical reading unit comprises a contact image sensor comprising an LED array and a sensor element, the LED array being disposed along the longitudinal direction of the transparent member and configured to irradiate the light onto the recording material, the sensor element being disposed along the longitudinal direction of the transparent member and configured to receive reflected light from the recording material.

12. An image forming system comprising:
an image forming apparatus comprising the image forming unit; and
the image reading apparatus according to claim 1 coupled to the image forming apparatus and configured to read the image on the recording material discharged from the image forming apparatus.

* * * * *